US009053030B2

(12) United States Patent
Kanoh

(10) Patent No.: US 9,053,030 B2
(45) Date of Patent: Jun. 9, 2015

(54) CACHE MEMORY AND CONTROL METHOD THEREOF WITH CACHE HIT RATE

(75) Inventor: Yasushi Kanoh, Tokyo (JP)

(73) Assignee: NEC CORPORATION, Tokyo (JP)

( * ) Notice: Subject to any disclaimer, the term of this patent is extended or adjusted under 35 U.S.C. 154(b) by 179 days.

(21) Appl. No.: 13/144,820

(22) PCT Filed: Jan. 25, 2010

(86) PCT No.: PCT/JP2010/050907
§ 371 (c)(1),
(2), (4) Date: Jul. 15, 2011

(87) PCT Pub. No.: WO2010/087310
PCT Pub. Date: Aug. 5, 2010

(65) Prior Publication Data
US 2011/0283041 A1    Nov. 17, 2011

(30) Foreign Application Priority Data

Jan. 28, 2009    (JP) ................................ 2009-016224

(51) Int. Cl.
*G06F 13/00*    (2006.01)
*G06F 12/08*    (2006.01)

(52) U.S. Cl.
CPC .................................. *G06F 12/0842* (2013.01)

(58) Field of Classification Search
None
See application file for complete search history.

(56) References Cited

U.S. PATENT DOCUMENTS

| 6,405,288 | B1* | 6/2002 | Chang ........................... 711/143 |
| 2003/0110356 | A1* | 6/2003 | Williams, III ................ 711/133 |
| 2004/0225840 | A1* | 11/2004 | O'Connor et al. ............ 711/122 |
| 2006/0143396 | A1* | 6/2006 | Cabot ........................... 711/134 |
| 2006/0218351 | A1* | 9/2006 | Smith et al. .................. 711/133 |
| 2006/0224829 | A1* | 10/2006 | Evrard et al. ................. 711/133 |
| 2006/0230223 | A1* | 10/2006 | Kruger et al. ..................... 711/6 |
| 2007/0033470 | A1* | 2/2007 | Damodaran et al. .......... 714/733 |
| 2007/0283121 | A1* | 12/2007 | Irish et al. .................... 711/202 |
| 2008/0065855 | A1* | 3/2008 | King et al. .................... 711/207 |
| 2009/0164727 | A1* | 6/2009 | Penton et al. ................. 711/118 |
| 2009/0187695 | A1* | 7/2009 | Irish et al. ......................... 711/3 |

FOREIGN PATENT DOCUMENTS

| JP | 63-284649 A | 11/1988 |
| JP | 4-270431 A | 9/1992 |
| JP | 2002082832 A | 3/2002 |
| JP | 2002268943 A | 9/2002 |

OTHER PUBLICATIONS

International Search Report for PCT/JP2010/050907 mailed Apr. 6, 2010.

* cited by examiner

*Primary Examiner* — Sean D Rossiter
(74) *Attorney, Agent, or Firm* — Sughrue Mion, PLLC

(57) ABSTRACT

A cache memory comprises a data array that stores a cashed block; a first address array that stores an address of the cached block; a second address array that stores an address of a first block to be removed from the data array when a cache miss occurs; and a control unit that transmits to a processor the first block stored in the data array as a cache hit block, when the address stored in the second address array results in a cache hit during a period before a second block which has caused the cache miss is read from a memory and written into the data array.

13 Claims, 15 Drawing Sheets

CACHE MEMORY AND CONTROL METHOD THEREOF WITH CACHE HIT RATE

REFERENCE TO RELATED APPLICATION

The present application is the National Phase of PCT/JP2010/050907, filed Jan. 25, 2010, which is based upon and claims the benefit of the priority of Japanese Patent Application No. 2009-016224 (filed on Jan. 28, 2009), the disclosure of which is incorporated herein in its entirety by reference.

TECHNICAL FIELD

The present invention relates to a cache memory and a control method of a cache memory. More specifically, the invention relates to a cache memory and a control method of a cache memory accessed by a multi-core or multi-thread processor.

BACKGROUND

Cache memories improve memory access performance of a computer based on temporal locality of access in which once-accessed data is likely to be accessed again and spatial locality of access in which it is highly probable that data close to the once-accessed data will be accessed. The capacity of a cache memory is, however, limited. Accordingly, it is necessary to efficiently utilize the limited capacity to improve a cache hit ratio. A location of the cache memory where a block to be cached is stored differs according to the mapping method of the cache memory.

In a full associative method, each block can be stored in any location of a cache memory. Thus, the cache memory can be efficiently utilized. In the full associative method, however, when searching whether or not there is a block in the cache, all blocks in the cache must be searched. Accordingly, it takes time to perform the search.

A direct mapping method is a method by which a search within a cache memory can be performed most simply. In the direct mapping method, a location where each block is stored is limited to a predetermined portion of the cache memory. In the direct mapping method, however, the location where each block is stored is fixed. Accordingly, a plurality of blocks to be stored in a same location cannot be simultaneously cached in the cache memory.

An N-way set associative method is intermediate between these two methods. In the N-way set associative method, there are N locations for storing a certain block, in a cache memory. That is, N blocks to be stored in a same location in the cache memory can be simultaneously cached. Further, when it is searched whether or not a block has been cached in the cache memory, N locations should be searched.

Patent Document 1 describes a victim cache memory for storing a block targeted for replacement and evicted from a cache memory so as to cache another block when a cache miss has occurred. The victim cache in Patent Document 1 is a cache of a small capacity (of several blocks) using the full associative method, and caches a block evicted from the cache memory. When a block in the victim cache memory has resulted in a cache hit, an evicted block and the block which has resulted in the cache hit are swapped (exchanged) between the cache memory and the victim memory.

Patent Document 1: JP Patent Kokai Publication No. JP-A-4-270431

SUMMARY

The entire disclosure of Patent Document listed above is incorporated herein by reference thereto. The following analyses are given by the present invention.

The victim cache memory described in Patent Document 1 has just the capacity of several blocks. Thus, a period of time where a block is held in the victim memory is considered to be short. The technology described in Patent Document 1 is a technology for improving a cache memory hit ratio by using a high likelihood of data that has been cached and evicted being accessed again immediately after the data has been evicted.

On the other hand, due to advancement of multi-core technology and multi-thread technology in a CPU, memory accesses by a plurality of threads may simultaneously occur to a cache memory. These memory accesses are made by the plurality of independent threads, and have no causal relation. A plurality of cache misses may therefore simultaneously occur. Accordingly, compared with the case of a single core or a single thread, the number of the cache misses that simultaneously occur may increase, so that a plurality of memory accesses caused by the cache misses may be simultaneously issued.

In the technology of the victim cache memory described in Patent Document 1, memory accesses from a multi-core or multi-thread CPU in which a plurality of cache misses may simultaneously occur cannot be efficiently processed. The reason for this is as follows. The victim cache memory is the cache memory of the small capacity (of several blocks) using the full associative method. Thus, when a plurality of cache misses have simultaneously occurred, a capacity of blocks which have caused the cache misses exceeds the capacity of the victim cache memory. When the capacity of the victim cache memory is increased so as to accommodate the plurality of cache misses, it is difficult to adopt the full associative method.

Therefore, there is a need in the art to provide a cache memory and a control method of a cache memory that improve a cache hit ratio of memory accesses from a multi-core or multi-thread processor.

According to a first aspect of the present invention, there is provided a cache memory comprising:
a data array that stores a cashed block;
a first address array that stores an address of the cached block;
a second address array that stores an address of a first block to be removed from the data array when a cache miss occurs; and
a control unit which transmits to a processor the first block stored in the data array as a cache hit block, when the address stored in the second address array results in a cache hit during a period before a second block that has caused the cache miss is read from a memory and written into the data array.

According to a second aspect of the present invention, there is provided a cache memory comprising:
an address array that stores an address of a block to be removed from a data array when a cache miss occurs; and
a control unit that transmits to a processor the block stored in the data array as a cache hit block, when the address stored in the address array results in a cache hit during a period before a block that has caused the cache miss is read from a memory and stored in the data array.

According to a third aspect of the present invention, there is provided a control method of a cache memory comprising a data array that stores a cached block, a first address array that stores an address of the cached block, and a second address array, the method comprising:
storing in the second address array an address of a first block to be removed from the data array when a cache miss occurs; and transmitting to a processor the first block stored in the data array as a cache hit block, when the address stored in the second address array results in a cache hit during a period before a second block that has caused the cache miss is read from a memory and written into the data array.

The present invention provides the following advantage, but not restricted thereto. According to the cache memory and the control method of the cache memory of the present invention, a cache hit ratio of memory accesses from a multi-core or multi-thread processor can be improved.

PREFERRED MODES

Figure 1:
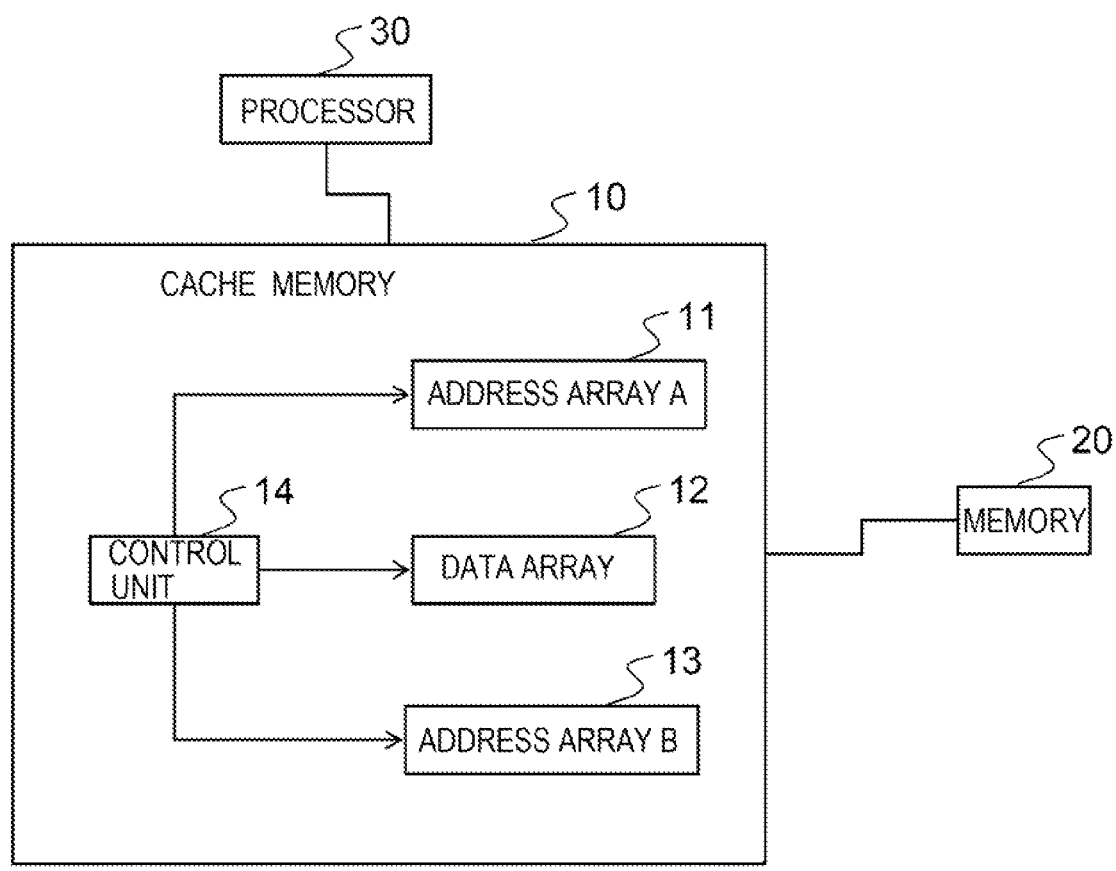
FIG. 1 is a block diagram showing a configuration of a cache memory according to an exemplary embodiment.

In the present disclosure, there are various possible modes, which include the following, but not restricted thereto. A cache memory according to an exemplary embodiment will be described with reference to drawings. FIG. 1 is a block diagram showing a configuration of the cache memory in the present exemplary embodiment. With reference to FIG. 1, a cache memory 10 comprises an address array A11, a data array 12, an address array B13, and a control unit 14. The cache memory 10 is connected to a memory 20 and a processor 30.

The first address array A11 stores the address of a cached block. The data array 12 stores the cached block. The second address array B13 stores the address of a first block which is a block to be evicted from the cache memory when a cache miss occurs.

Before a second block, which is a block that has caused the cache miss, read from the memory 20 and written into the data array 12, the control unit 14 transmits the first block stored in the data array 12 to the processor 30 as a cache hit block when the address stored by the address array B13 has resulted in a cache hit.

According to the cache memory in this exemplary embodiment, the block (or the first block) to be evicted due to the cache miss can be processed as the cache hit block during a period where the block (or the second block) that has caused the cache miss is read from the memory 20 and is then stored in the data array 12 of the cache memory 10. Accordingly, a follow-on access to the block to be evicted due to the cache miss is cache hit for a given period of time. A cache hit ratio can be thereby improved. Further, according to the cache memory in the present exemplary embodiment, even if a lot of cache misses have simultaneously occurred and even if there are a lot of blocks to be evicted, cash hit can be made to occur for a given period of time. A block which has caused a cache miss is defined to be a block that is not stored in the data array 12 of the cache memory 10, and to be read from the memory 20 and stored in the data array 12.

Preferably, the control unit 14 invalidates the address of the first block stored by the address array B13 when writing the second block read from the memory 20 into the data array 12. This operation is performed to allow the control unit 14 to recognize that the first block has been replaced by the second block in the data array 12 and the first block is no longer present in the cache memory 10.

Preferably, the address array B13 stores an identifier for a way of the data array 12 in which the first block is stored. This operation is performed because the cache memory and a control method of the cache memory according to the present exemplary embodiment can be expanded to an N-way associative method.

Preferably, the address array B13 stores a flag indicating whether or not the first block has resulted in the cache hit and has been rewritten. In this case, before the second block is read from the memory 20 and written into the data array 12, the control unit 14 preferably refers to the flag stored in the address array B13 and, if the first block has been rewritten, writes back the first block into the memory 20. This operation is performed, because, in doing so, cache coherency (coherency of the cache) can be maintained.

Preferably, an electronic computer comprises the cache memory 10 described above. The electronic computer may further comprise a multi-core or multi-thread processor. By including the cache memory according to this exemplary embodiment, a cache hit ratio of memory accesses can be improved in the electronic computer including the multi-core or multi-thread processor.

FIRST EXAMPLE

A cache memory according to a first example will be described in detail with reference to drawings.

Figure 2:
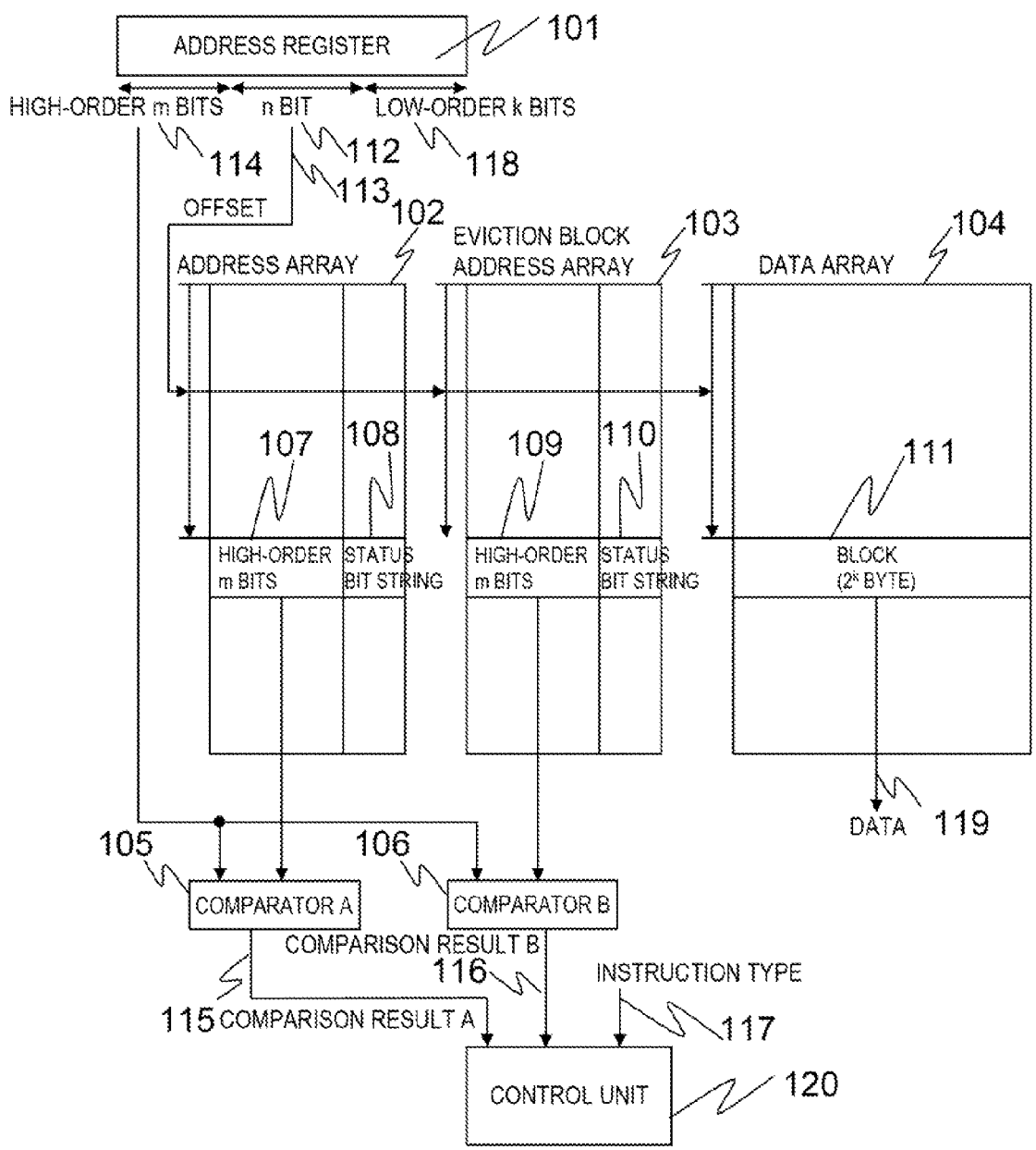
FIG. 2 is a diagram showing a configuration of the cache memory in a first example.

Referring to FIG. 2, the cache memory in the first example comprises an address register 101, an address array 102, an eviction block address array 103, a data array 104, a comparator A 105, a comparator B 106, and a control unit 120.

The address array 102 is a memory having $2^n$ entries. One entry includes high-order m bits 107, which are a part of the address of a block and a status bit string 108 indicating a status of that block.

The eviction block address array 103 is a memory having $2^n$ entries. Each entry includes high-order m bits 109, which are a part of the address of a block, and a status bit string 110 indicating a status of that block.

The data array 104 is a memory having $2^n$ entries. Each entry stores a block 111 of $2^k$ bytes.

The comparator A 105 compares the high-order m bits 114 in the address register with the address of the high-order in bits 107 of the entry in the address array 102 accessed using n bits 112 in the address register 101 as an offset 113. When the m bits 114 match the high-order m bits 107, it means that the entry of the block is already present in the cache memory.

The comparator B 106 compares the high-order m bits 114 in the address register with the address of the high-order m bits 109 of the entry in the eviction block address array 103 accessed using then bits 112 in the address register 101 as the offset 113. When the m bits 114 match the high-order m bits 109, it means that the entry of the block is already present in the cache memory.

The control unit 120 controls the cache memory, based on a comparison result A115 from the comparator A 105, a comparison result B 116 from the comparator B 106, a instruction type (load or store) from a CPU, the status bit string 108 in the address array and the status bit string 110 in the eviction block address array which have been read.

In the following explanation, it is assumed that each address stored in the address register 101 is composed of 64 bits, k=6 or the size of each block is 64 bytes, n=10 or the number of entries of each of the address array 102, eviction block address array 103, and the data array 104 is 1024, and m=48. It is also assumed that the cache memory in the present example is a cache memory using a direct mapping method.

Next, operation of the cache memory in FIG. 2 will be described. When an access to the cache memory is made, the address of the access is set in the address register 101. The address may be a logical address, or a physical address. It is assumed herein that the address is the physical address translated from a virtual address by some address translation means.

Since the size of each block is 64 bytes, low-order 6 (k) bits 118 in the address register 101 constitute the address of the block. Using the 10(n) bits 112 which are higher-order than the low-order 6 (k) bits 118 as the offset 113, an entry in each of the address array 102 and the eviction address array 103 is read.

The comparator A 105 compares the high-order 48 (m) bits 107 of the address of the read entry with the high-order 48 (m) bits 114 in the address register 101, and the comparator B 106 compares the high-order 48 (m) bits 109 of the address with the high-order 48 (m) bits 114 in the address register 101 to determine whether or not the entry of that block is already present in the cache memory.

The comparison result A115 and the comparison result B 116 are supplied to the control unit 120 together with the instruction type (load, store) 117, the status bit string 108 of the entry read from the address array 102 and the status bit string 110 of the entry read from the eviction block address array 103 to determine the operation of the cache memory. Determination of the operation by the control unit 120 and details of the operation will be described later in a part of description of the operation.

Figure 3:
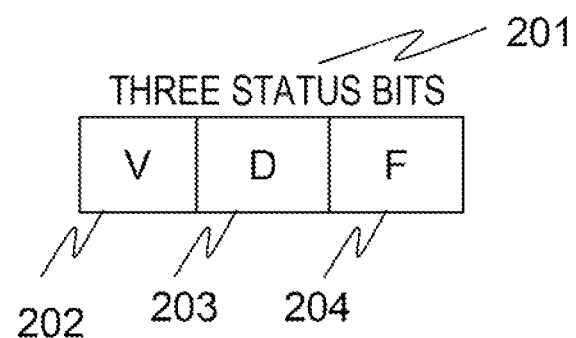
FIG. 3 includes diagrams showing status bit strings in each of the cache memory in the first example and a cache memory in a second example.
Figure 3:
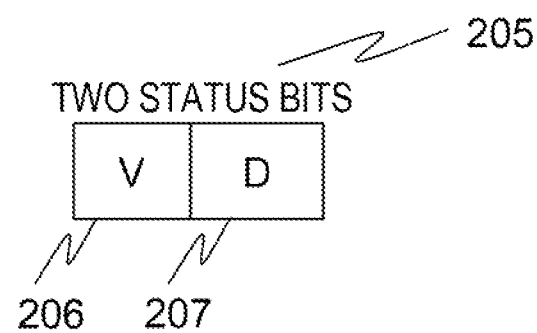

FIG. 3 describes the status bit strings 108 and 110 in FIG. 2 in detail. Three status bits 201 in the address array 102 are composed of three bits which are constituted from a flag V202 indicating whether or not the entry of the address array is valid, a flag D203 indicating whether or not the block of the data array has been rewritten, and a flag F204 indicating whether or not the block of the address array is being read from the memory.

When the entry of the address array 102 is valid, the flag V202 indicates 1. When the entry of the address array 102 is invalid, the flag V202 indicates 0. When the block has been rewritten, the flag D203 indicates 1. When the block has not been rewritten, the flag D203 indicates 0. When the block of the address array is being read from the memory, the flag F204 indicates 1. When the block of the address array is not being read from the memory, the flag F204 indicates 0.

Two status bits 205 of the eviction block address array 103 includes two bits which are a flag V206 indicating whether or not the entry of the eviction block address array is valid and a flag D207 indicating whether or not the block of the data array has been rewritten.

When the entry of the eviction block address array 103 is valid, the flag V206 indicates 1. When the entry of the eviction block address array 103 is invalid, the flag V206 indicates 0. When the block has been rewritten, the flag D207 indicates 1. When the block has not been rewritten, the flag D207 indicates 0.

Next, operation in the first example will be described in detail with reference to the components in FIG. 2 and the bit strings in FIG. 3 each indicating a status and others.

Figure 4:
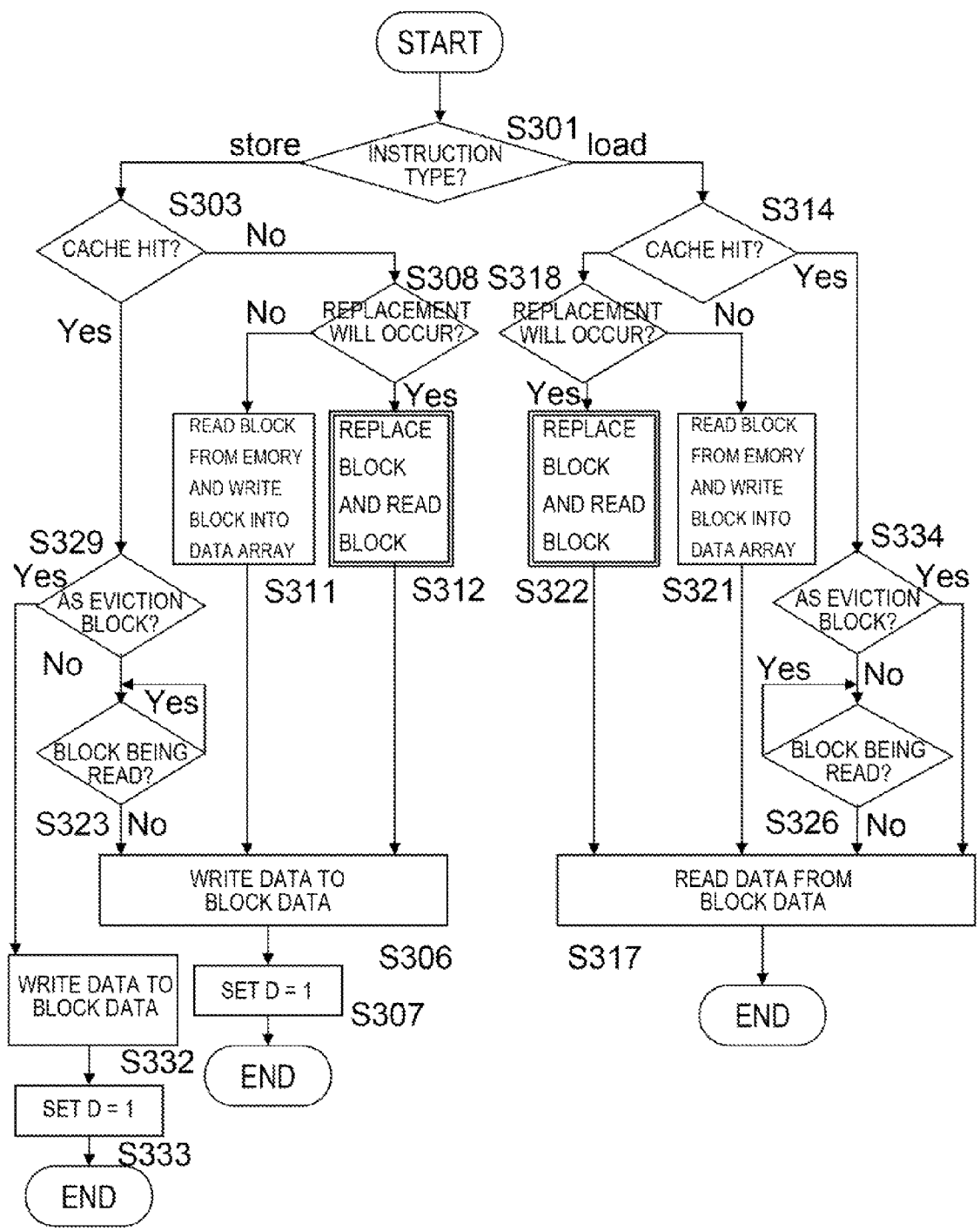
FIG. 4 is a flowchart showing operation of the cache memory in the first example.

FIG. 4 is a flowchart explaining determination of the operation by the control unit 120 in FIG. 2 and the operation.

An accessed address is stored in the address register 101 in FIG. 2, and entries in the address array 102, the eviction block address array 103, and the data array 104 are accessed using the 10 (n) bits 112 in the address register 101.

Determination of the operation by the control unit 120 and the operation at this point will be described.

The control unit 120 determines a process to be performed according to the instruction type 117 from the CPU (in step S301).

First, when the instruction type 117 is store (store in step S301), the control unit 120 determines whether or not a cache hit has occurred (in step S303). The control unit 120 determines whether or not accessed data has resulted in the cache hit according to the comparison result A115 from the comparator A 105, the comparison result B 116 from the comparator B 106, the status bit string 108 in the address array 102 and the status bit string 110 in the eviction block address array 103 (in step S303). When the comparison result A115 indicates a match and the flag V202 of the status bit string 108 indicates 1, or when the comparison result B 116 indicates a Match and the flag V206 of the status bit string 110 indicates 1, the control unit 120 determines that the accessed data has resulted in the cache hit (Yes in step S303).

On the other hand, when the comparison result S115 indicates a mismatch or when the flag V202 of the status bit string 108 indicates 0, the control unit 120 determines that the accessed data has caused a cache miss when the comparison result B 116 indicates a mismatch or when the flag V206 of the status bit string 110 indicates 0 (No in step S303).

When the accessed data has resulted in the cache hit (Yes in Step S303), the control unit 120 determines in which one of the normal address array 102 and the eviction block address array 103 the cache hit has occurred, based on whether or not the comparison result A115 has indicated the match or the comparison result B 116 has indicated the match (in step S329).

When the cache hit has occurred in the normal address array (No in step S329), the control unit 120 determines whether or not the block of the accessed address is being read, based on the flag F204 of the status bit string 108 (in step S323). When the flag F204 indicates 1, and then when the control unit 120 determines that the block is being read (Yes in step S323), the control unit 120 waits for completion of the reading. When the flag F204 indicates 0 and then when the control unit 120 determines that the block is not being read (No in step S323), the control unit 120 specifies the word of data in the block, based on low-order 6 (k) bit data (in step S306), and writes write data in the word, and sets the flag D203 of the status bit string 108 to 1 (in step S307).

When the cache hit has occurred in the eviction block address array 103 (Yes in step 329), the control unit 120 specifies the word of data in the block, based on the data of low-order 6 (k) bits, and writes write data to the word (in step S332). Then, the control unit 120 sets the flag D207 of the status bit string 110 to 1 (in step S333).

When the accessed data has caused the cache miss (No in step 303), the control unit 120 determines whether or not replacement of a cache block will occur (in step S308). When there is a block which already uses the entry (for which the flag V202 of the status bit string 108 indicates 1), the control unit 120 determines that the replacement will occur (Yes in step 308). On the other hand, when that entry is vacant (or the flag V202 of the status bit string 108 indicates 0), the control unit 120 determines that the replacement will not occur (No, in step 308).

When the control unit 120 determines that the replacement of the block will not occur (No in step S308), the control unit 120 stores the high-order m bits 114 in the address register 101 in the high-order m bits in the address array 102, sets the flag V202 and the flag F204 of the status bit string 108 to 1, and reads the block from the memory. Then, when the read block has arrived, the control unit 120 writes the read block to the block 111 of the data array 104, and sets the flag F204 of the status bit string 108 in the address array 102 to 0 (in step S311). Then, the control unit writes the data into the block 111 (in step S306), and sets the flag D203 of the status bit string 108 in the address array 102 to 1 (in step S307).

When the control unit 120 determines that the replacement of the block will occur (in step S309), the control unit 120 performs the replacement of the block and block reading (in step S312). Step S312 will be described later, with reference to FIG. 5. After step S312, the control unit 120 writes the data in the block (in step S306), and sets the flag D203 of the status bit string 108 in the address array 102 to 1 (in step S307).

Next, when the instruction type 117 is load (load in step S301), the control unit 120 determines whether or not a cache hit has occurred (in step S314). The control unit 120 determines whether or not accessed data has resulted in the cache hit according to the comparison result A115 from the comparator A 105, the comparison result, B 116 form the comparator B 106, the status bit string 108 in the address array 102 and the status bit string 110 in the eviction block address array 103 (in step S314).

When the comparison result A115 indicates a match and the flag V202 of the status bit string 108 indicates 1, or when the comparison result B 116 indicates a match and the flag V206 of the status bit string 110 indicates 1, the control unit 120 determines that the accessed data has resulted in the cache hit (Yes in step S314).

On the other hand, when the comparison result S115 indicates a mismatch or when the flag V202 of the status bit string 108 indicates 0, the control unit 120 determines that the accessed data has caused a cache miss when the comparison result B 116 indicates a mismatch or when the flag V206 of the status bit string 110 indicates 0 (No in step S314).

When the accessed data has resulted the cache hit (Yes in Step S314), the control unit 120 determines in which one of the normal address array 102 and the eviction block address array 103 the cache hit has occurred, based on whether the comparison result A115 indicates the match or the comparison result B 116 indicates the match (in step S334).

When the cache hit has occurred in the normal address array (No in step S334), the control unit 120 determines whether or not the block of the accessed data is being read, based on the flag F204 of the status bit string 108 (in step S326). When the flag F204 indicates 1, and then when the control unit 120 determines that the block is being read (Yes in step S326), the control unit 120 waits for completion of the reading. On the other hand, when the flag F204 indicates 0 and then when the control unit 120 determines that the block is not being read (No in step S326), the control unit 120 specifies the word of data in the block, based on data of low-order 6 (k) bits, and reads the word from the block 111 (in step S317).

When the cache hit has occurred in the eviction block address array 103 (Yes in step 334), the control unit 120 specifies the word of the data in the block, based on the data of low-order 6 (k) bits, and reads the word from the block 111 (in step S317).

When the accessed data has caused the cache miss (No in step 314), the control unit 120 determines whether or not replacement of a cache block will occur (in step S318). When there is a block which already uses the entry (and for which the flag V202 of the status bit string 108 indicates 1), the control unit 120 determines that the replacement will occur (Yes in step 318). On the other hand, when that entry is vacant (or the flag V202 of the status bit string 108 indicates 0), the control unit 120 determines that the replacement will not occur (No, in step 318).

When the control unit 120 determines that the replacement of the block will not occur (No in step S318), the control unit 120 stores the high-order m bits 114 in the address register 101 in the high-order m bits in the address array 102, sets the flag V202 and the flag F204 of the status bit string 108 to 1, and reads the block from the memory. Then, when the read block has arrived, the control unit 120 writes the read block to the block 111 of the data array 104, and sets the flag F204 of the status bit string 108 of the address array 102 to 0 (in step S321). Next, the control unit reads the data from the block 111 (in step S317).

On the other hand, when the control unit 120 determines that the replacement of the block will occur (Yes in step S318), the control unit 120 performs the replacement of the block and block reading (in step S322). Step S322 will be described later, with reference to FIG. 5. After step S322, the control unit 120 reads the data from the block (in step S317).

Figure 5:
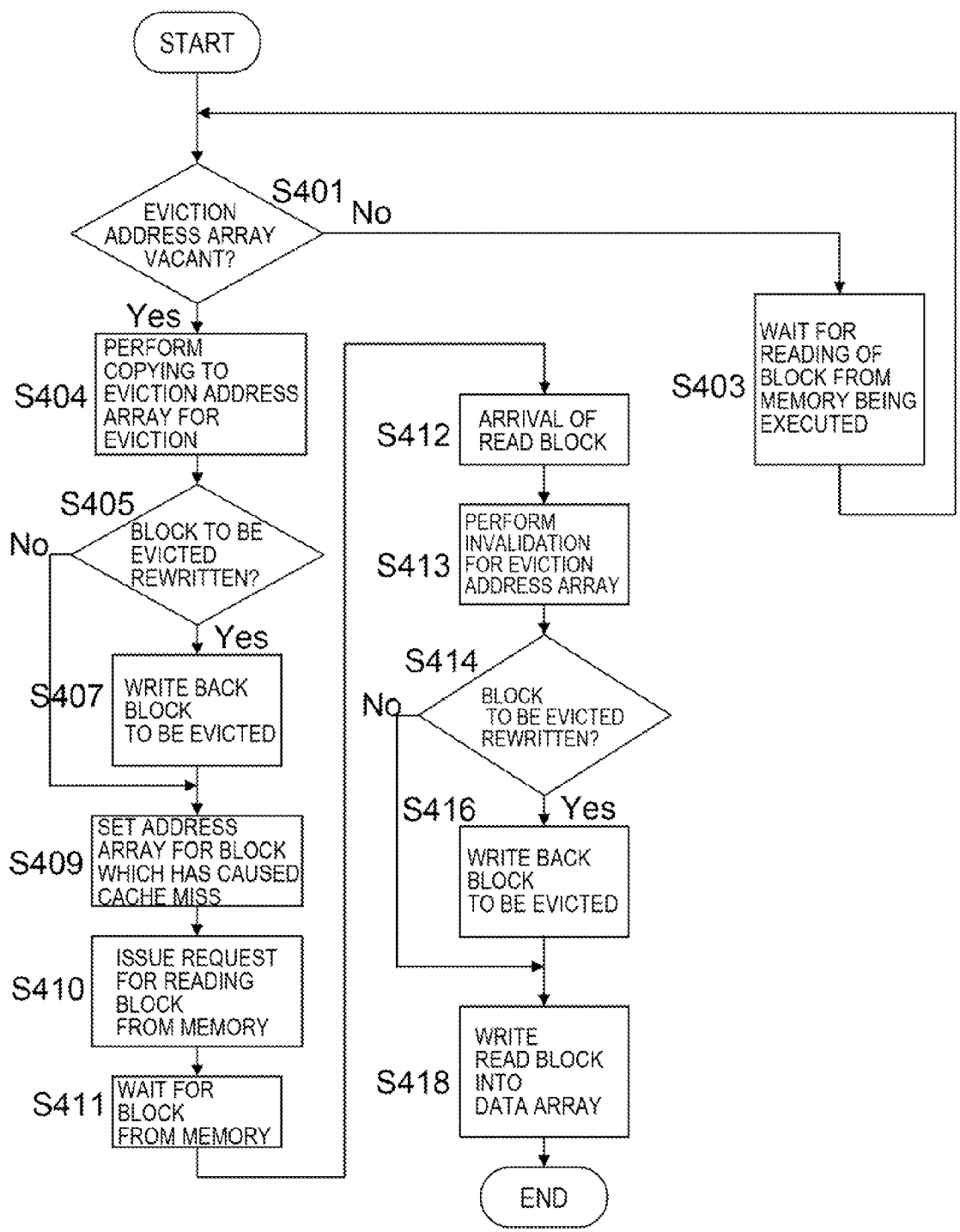
FIG. 5 is a flowchart showing a block replacement operation and a block read operation of the cache memory in the first example.

Next, steps S312 and S322 in FIG. 4 will be described, with reference to FIG. 5.

First, the control unit 120 determines whether or not the entry of the eviction block address array 103 is vacant (in step S401). When the flag V206 of the status bit string 110 in the eviction block address array 103 indicates 0, the control unit 120 determines that the entry is vacant. When the flag V206 of the status bit string 110 in the eviction block address array 103 indicates 1, the control unit 120 determines that the entry is not vacant (in step S401).

When the control unit 120 determines that the entry is not vacant (No in step S401), a cache miss has already occurred, and the block reading from the memory for the replacement is being executed. Thus, the control unit 120 waits for completion of the block reading (in step S403). After the reading has been completed, the operation returns to step S401.

When the control unit 120 determines that the entry is vacant (Yes in step S401), the control unit 120 copies the high-order m bits 107 in the address array 102 to be evicted to the high-order m bits 109 in the eviction block address array 103. Then, the control unit 120 sets the flag V206 and the flag D207 of the status bit string 110 to 1 and 0, respectively (in step S404). Next, the control unit 120 determines whether or not the block to be evicted has been rewritten, based on whether the flag D203 of the status bit string 108 indicates 1 or 0 (in step S405).

Only when the control unit 120 determines that the block to be evicted has been rewritten (Yes in step S405), the control unit 120 writes back the block 111 in the data array 104 to the address indicated by the high-order m bits 107 in the address array 102 (in step S407).

Next, the control unit 120 copies the high-order m bits 114 in the address register 101 to the high-order m bits 107 in the address array 102. Further, the control unit 120 sets the flag V202 and the flag F204 of the status bit string 108 in the address array 102 to 1, and sets the flag D203 of the status bit string 108 to 0 (in step S409). Then, the control unit 120 issues to the memory a request for reading the block which has caused the cache miss (in step S410). Next, the control unit 120 waits for arrival of the block from the memory (in step S411).

During a period before arrival of the block, the block which has been invalid in a related art and will be evicted becomes valid on the eviction block address array. Data in the block which will be evicted remains in the block 111 of the data array 104.

Next, the block which has been read arrives at the cache memory (in step S412). The control unit 120 sets the flag V206 of the status bit string 110 in the eviction block address array 103 to 0, for invalidation (in step S413). Next, the control unit 120 examines the flag D207 of the status bit string 110 of the eviction block address array 103 to check whether or not the block has been rewritten (in step S414).

Only when the control unit 120 determines that the block has been rewritten (Yes in step S414), the control unit 120 writes back the block of the data array 104 to the address indicated by the high-order m bits 109 in the eviction block address array 103 (in step S416). Next, the block which has been read from the memory is written into the block 111 of the data array 104. Then, the control unit 120 sets the flag F204 of the status bit string 108 in the address array 102 to 0 (in step S418).

SECOND EXAMPLE

Figure 6:
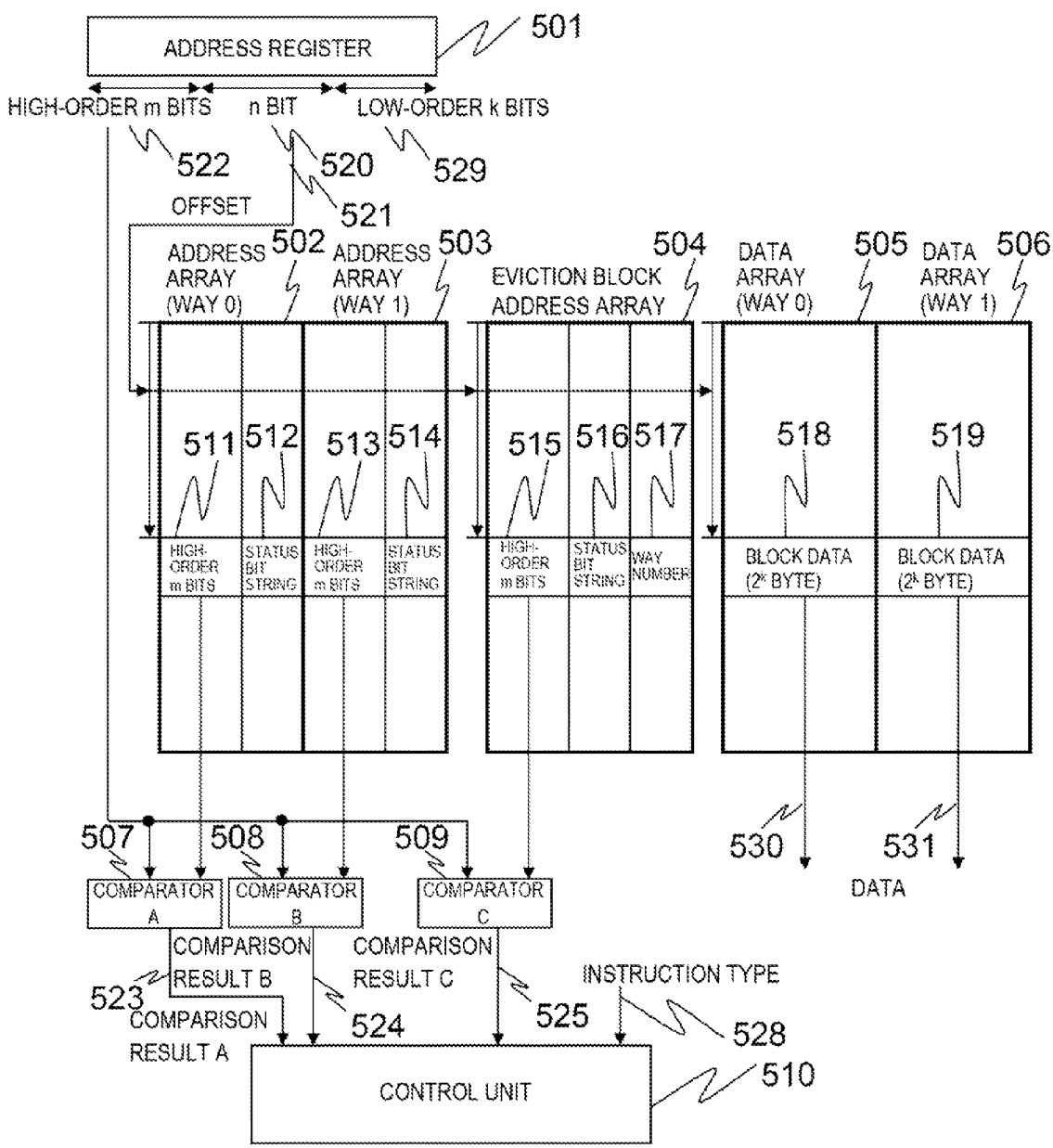
FIG. 6 is a diagram showing a configuration of the cache memory in the second example.

A second example will be described in detail with reference to drawings. Referring to FIG. 6, a cache memory in the second example comprises an address register 501, an address array (way 0) 502, an address array (way 1) 503, an eviction block address array 504, a data array (way 0) 505, a data array (way 1) 506, a comparator A 507, a comparator B 508, a comparator C 509, and a control unit 510.

Each of the address arrays 502 and 503 is a memory having $2^n$ entries. One entry includes one of high-order m bits 511 and high-order m bits 513, each of which are a part of the address of a block, and one of a status bit string 512 and a status bit string 514 each indicating a status of the block.

The eviction block address array 504 is a memory having $2^n$ entries. One entry includes high-order m bits 515, which are a part of the address of a block, a status bit string 516 indicating a status of the block, and a way number 517 indicating in which way's data array the block stored in the data array is present.

Each of the data arrays 505 and 506 is a memory having $2^n$ entries. One entry stores a block 518 or 519 of $2^k$ bytes.

The comparator A 507 compares high-order m bits 522 in the address register with the address of the high-order in bits 511 of the entry in the address array 502 accessed using n bits 520 in the address register 501 as an offset 521.

The comparator B 508 compares the high-order in bits 522 in the address register 501 with the address of the high-order m bits 513 of the entry in the address array 503 accessed using the n bits 520 in the address register 101 as the offset 521.

The comparator C 509 compares the high-order m bits 522 in the address register 501 with the address of the high-order m bits 515 of the entry in the eviction block address array 504 accessed using the n bits 520 in the address register 101 as the offset 521.

The control unit 510 controls the cache memory, based on a comparison result A 523 from the comparator A 507, a comparison result B 524 from the comparator B 508, a comparison result C 525 from the comparator C 509, a instruction type (load or store) 528 from a CPU, the status bit string 512 in the address array 502, the status bit string 514 in the address array 503, the status bit string 516 in the eviction block address array 504, and the way number 517 which have been read.

Though not illustrated in FIG. 6, information indicating a (Least Recently Used, LRU) way having a long period of time during which the way is not used is provided for each column in order to determine a way targeted for replacement. Based on the information mentioned above, the way targeted for the replacement is selected.

In the following description, it is assumed that each address stored in the address register 101 is composed of 64 bits, k=6 or the size of each block is 64 bytes, n=10 or the number of entries of each of the address array 502, the address array 503, the eviction block address array 504, the data array 505, and the data array 506 is 1024, and m=48. Herein, the cache memory using a two-way set associative type is shown as an example. However, the number of ways is arbitrary. Further, the number of eviction block address arrays is set to one. However, the number of the eviction block address arrays is also arbitrary. The number of ways and the number of eviction block address arrays in a set associative method influence the number of address comparators, and the like.

Next, operation of the cache memory in FIG. 6 will be described. When an access to the cache memory is made, the address of the access is set in the address register 501. The address may be a logical address, or a physical address. It is assumed herein that the address is the physical address translated from a virtual address by some address translation means, and the description will be given.

Since the size of each block is 64 bytes, low-order 6 (k) bits 529 in the address register 101 constitute the address of the block. Using 10(n) bits 520 which are higher-order than the low-order 6 (k) bits 529 as the offset 521, entries in the address array 502, the address array 503, and the eviction address array 504 are read. The comparator A 507 compares the high-order 48 (m) bits 522 in the address register 501 with the high-order 48 (m) bits 511 of the address of the entry read from the address array (way 0) 502. The comparator B 508 compares the high-order 48 (m) bits 522 in the address register 501 with the high-order 48 (m) bits 513 of the address of the entry read from the address array (way 1) 503. The comparator C 509 compares the high-order 48 (m) bits 522 in the address register 501 with the high-order 48 (in) bits 515 of the address of the entry read from the eviction block address array 504. The control unit 510 determines whether or not the entry of that block is already present in the cache memory, based on these comparison results.

The comparison result A 523, the comparison result B 524, and the comparison result C 525 are supplied to the control unit 510 together with the instruction type (load or store) 528, the status bit string 512 of the entry read from the address array 502, the status bit string 514 of the entry read from the address array 503, the status bit string 516 of the entry read from the eviction block address array 504 to determine the operation of the cache memory. Determination of the operation by the control unit 510 and details of the operation will be described later in a part of description of the operation.

Each of the status bit string 512 in the address array 502 and the status bit string 514 in the address array 503 in the second example is the same as the status bit string 201 in the first example in FIG. 3. Further, the status bit string 516 in the eviction block address array 504 in the second example is the same as the status bit string 205 in the first example in FIG. 3.

Next, operation of the second example will be described in detail with reference to the components in FIG. 6 and the bit strings in FIG. 3 each indicating a status and others.

Figure 7:
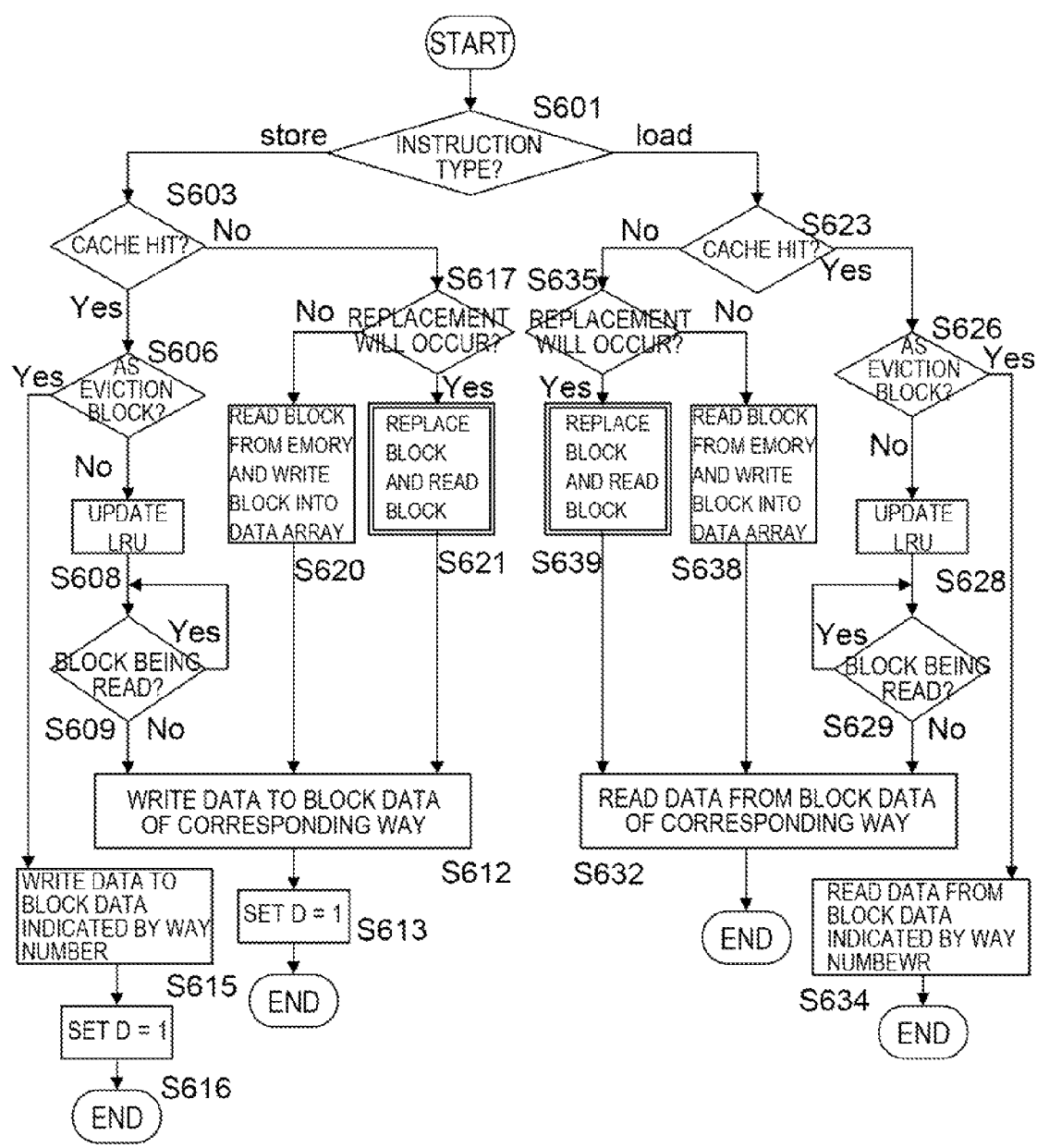
FIG. 7 is a diagram showing operation of the cache memory in the second example.

FIG. 7 is a flowchart for explaining determination of the operation by the control unit 510 in FIG. 6 and the operation.

An accessed address is stored in the address register 501 in FIG. 6, and entries in the address array 502, the address array 503 the eviction block address array 504, the data array 505, and the data array 506 are accessed using the 10 (n) bits 520 in the address register 501. Determination of the operation by the control unit 510 and the operation at this point will be described.

The control unit 510 determines a process to be performed according to the instruction type 528 from a CPU (in step S601).

First, when the instruction type 528 is store (store in step S601), the control unit 510 determines whether or not a cache hit has occurred (in step S603). The control unit 510 determines whether or not accessed data has resulted in the cache hit according to the comparison result A 523 from the comparator A 507, the comparison result B 524 from the comparator B 508, the comparison result C 525 from the comparator C 509, the status bit string 512 in the address array 502, the status bit string 514 in the address array 503, and the status bit string 516 in the eviction block address array 504 (in step S603).

When the comparison result A 523 indicates a match and the flag V202 of the status bit string 512 indicates 1, when the comparison result B 524 indicates a match and the flag V202 of the status bit string 514 indicates 1, or when the comparison result C 525 indicates a match and the flag V206 of the status bit string 516 indicates 1, the control unit 510 determines that the accessed data has resulted in the cache hit (Yes in step S603).

On the other hand, when the comparison result A 523 indicates a mismatch or the flag V202 of the status bit string 512 indicates 0, and when the comparison result C 524 indicates a mismatch or the flag V202 of the status bit string 514 indicates 0, the control unit 510 determines that the accessed data has resulted a cache miss when the comparison result C 525 indicates a mismatch or the flag V206 of the status bit string 516 indicates 0 (No in step S603).

When the accessed data has resulted in the cache hit (Yes in Step S603), the control unit 510 determines in which one of the normal address array 502, the normal address array 503, and the eviction block address array 504 the cache hit has occurred, based on whether the comparison result A 523 or the comparison result B 524 has indicated the match or the comparison result C 525 has indicated the match (in step S606).

When the cache hit has occurred in the normal address array 502 or 503 (No in step S606), the control unit 510 first updates an LRU (in step S608). Then, the control unit 510 determines whether or not the block of the accessed data is being read, based on the flag F204 of the status bit string 512 or 514 (in step S609).

When the flag F204 indicates 1, and then when the control unit 510 determines that the block is being read (Yes in step S609), the control unit 510 waits for completion of the reading. On the other hand, when the flag F204 indicates 0 and then when the control unit 510 determines that the block is not being read (No in step S609), the control unit 510 specifies the word of data in the block, based on low-order 6 (k) bit data, and writes write data in the word (in step S612), and sets the flag D203 of the status bit string 512 or 514 to 1 (in step S613).

When the cache hit has occurred in the eviction block address array 504 (Yes in step 606), the control unit 510 writes write data to the word of the block 518 of the data array (way 0) or the block 519 of the data array 506 of the way indicated by the way number 517 (in step S615). The word is specified based on the low-order 6 (k) bit data. Then, the control unit 510 sets the flag D207 of the status bit string 516 to 1 (in step S616).

When the cache miss has occurred (No in step 603), the control unit 510 determines whether or not replacement of a cache block will occur (in step S617).

When all the ways in the cache memory are used (when the flags V202 of the status bit strings 512 and 514 indicate 1), the control unit 510 determines that the replacement will occur (Yes in step 617). On the other hand, when there is even one vacant way (when the flag V202 of the status bit string 512 or 514 indicates 0), the control unit 510 determines that the replacement will not occur (No in step 617).

When the control unit determines that that the replacement of the block will not occur (No in step S617), the control unit 510 stores the high-order m bits 552 in the address register 501 in the high-order m bits 511 of the address array 502 or the high-order m bits 513 of the address array 503 of the way which is vacant, sets the flag V202 and the flag F204 of the status bit string 512 or 514 to 1, and reads the block from a memory. Then, when the read block has arrived, the control unit 510 writes the read block to the block 518 of the data array 505 or the block 519 of the data array 506, and sets the flag F204 of the status bit string 512 in the address array 502 or the status bit string 514 in the address array 503 to 0 (in step S620). Then, the control unit 510 writes the data into the block 518 or 519 (in step S612), and sets the flag D203 in the status bit string 512 of the address array 502 or the status bit string 514 in the address array 503 to 1 (in step S613).

When the control unit 510 determines that the replacement of the block will occur (Yes in step S617), the control unit 510 performs the replacement of the block and block reading (in step S621). Step S621 will be described later, with reference to FIG. 6. After step S621, the control unit 510 writes the data in the read block (in step S612), and sets the flag D203 of the status bit string 512 in the address array 502 or the status bit string 514 in the address array 503 to 1 (in step S613).

Next, when the instruction type 528 is load (load in step S601), the control unit 510 determines whether or not a cache hit has occurred (in step S623). The control unit 510 determines whether or not accessed data has resulted in the cache hit according to the comparison result A 523 from the comparator A 507, the comparison result B 524 from the comparator B 508, the comparison result C 525 from the comparator C 509, the status bit string 512 in the address array 502, the status bit string 514 in the address array 503, and the status bit string 516 in the eviction block address array 504 (in step S623).

When the comparison result A 523 indicates a match and the flag V202 of the status bit string 512 indicates 1, when the comparison result B 524 indicates a match and the flag V202 of the status bit string 514 indicates 1, or when the comparison result C 525 indicates a match and the flag V206 of the status bit string 516 indicates 1, the control unit 510 determines that the accessed data has resulted in the cache hit (Yes in step S623).

On the other hand, when the comparison result A 523 indicates a mismatch or the flag V202 of the status bit string 512 indicates 0 and when the comparison result B 524 indicates a mismatch or the flag V202 of the status bit string 514 is 0, the control unit 510 determines that the accessed data has caused the cache miss when the comparison result C 525 indicates a mismatch or when the flag V206 of the status bit string 516 indicates 0 (No in step S623).

When the cache hit has occurred (Yes in Step S623), the control unit 510 determines in which one of the normal address array 502, the normal address array 503, and the eviction block address array 504 the cache hit has occurred, based on whether the comparison result A 523 or the comparison result B 524 indicates the match or the comparison result C 525 indicates the match (in step S626).

When the cache hit has occurred in the normal address array 502 or 503 (No in step S626), the control unit 510 first updates the LRU (in step S628). Then, the control unit 510 determines whether or not the block of the accessed data is being read, based on the flag F204 of the status bit string 512 or 514 (in step S629). When the flag F204 indicates 1, and then when the control unit 510 determines that the block is being read (Yes in step S629), the control unit 510 waits for completion of the reading. When the flag F204 indicates 0 and the block is not being read (No in step S629), the control unit 510 specifies the word in the block 518 or 519 corresponding to low-order 6 (k) bit data, based on the low-order 6 (k) bit data, and read the word (in step S632).

When the cache hit has occurred in the eviction block address array 504 (Yes in step 626), the control unit 510 reads the word in the block 518 of the data array 505 or the block 519 of the data array 506 of the way indicated by the way number 517, based on the low-order 6 (k) bit data (in step S634). The word is specified based on the low-order 6 (k) bit data.

When the cache miss has occurred (No in step 623), the control unit 510 determines whether or not replacement of a cache block will occur (in step S635). When all the ways in the cache memory are already used (when the flags V202 of the status bit strings 512 and 514 indicate 1), the control unit 510 determines that the replacement will occur (Yes in step 635). When there is even one vacant way (when the flag V202 of the status bit string 512 or 514 indicates 0), the control unit 510 determines that the replacement will not occur (No in step S635).

When the control unit 510 determines that the replacement of the block will not occur (No in step S635), the control unit 510 stores the high-order m bits 552 in the address register 501 in the high-order m bits 511 of the address array 502 or the high-order m bits 513 of the address array 503 of the way which is vacant, sets the flag V202 and the flag F204 of the status bit string 512 or 514 to 1, and reads the block from the memory. Then, when the read block has arrived, the control unit 510 writes the read block to the block 518 of the data array 505 or the block 519 of the data array 506, and sets the flag F204 of the status bit string 512 in the address array 502 or the status bit string 514 in the address array 503 to 0 (in step S638). Then, the control unit 510 reads the data from the block 518 or 519 (in step S632).

When the control unit 510 determines that the replacement of the block will occur (Yes in step S635), the control unit 510 performs the replacement of the block and block reading (in step S639). Step S639 will be described later, with reference to FIG. 8. After step S639, the control unit 510 reads the data from the read block (in step S632).

Figure 8:
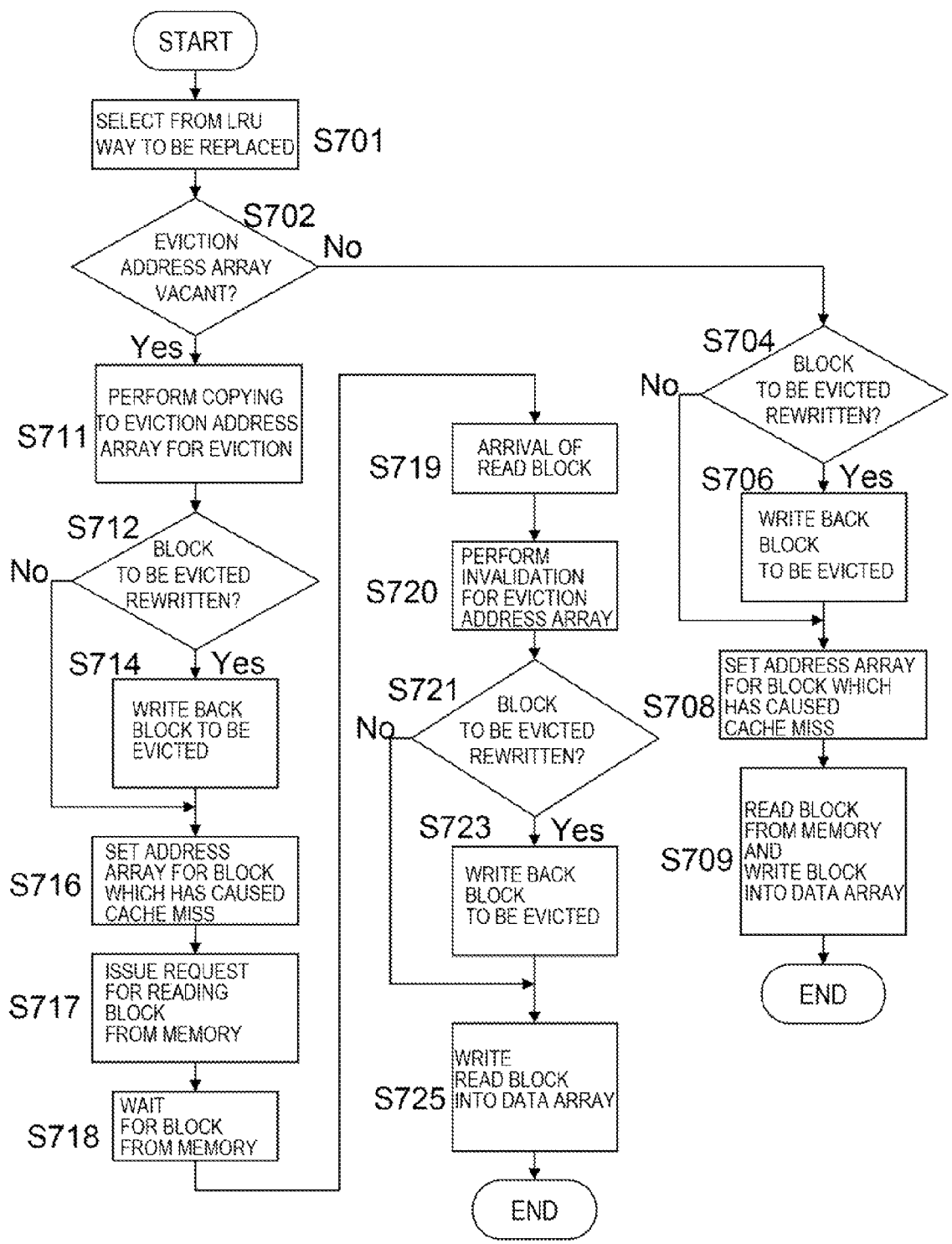
FIG. 8 is a flowchart showing a block replacement operation and a block read operation of the cache memory in the second example.

Next, steps S621 and S639 in FIG. 7 will be described, with reference to FIG. 8. First, the control unit 510 selects the way to be replaced, according to the LRU (in step S701), and updates the LRU.

First, the control unit 510 determines whether or not the entry of the eviction block address array 504 is vacant (in step S702). When the flag V206 of the status bit string 516 of the eviction block address array 504 indicates 0, the control unit 510 determines that the entry is vacant. When the flag V206 of the status bit string 516 in the eviction block address array 103 indicates 1, the control unit 510 determines that the entry is not vacant.

When the control unit 510 determines that the entry is not vacant (No in step S702), the control unit 510 determines whether or not the block to be evicted has been rewritten, based on the flag D203 of the status bit string 512 in the address array 502 or the status bit string 514 in the address array 503 (in step S704).

Only when the control unit 510 determines that the block to be evicted has been rewritten (Yes in step S704), the control unit 510 writes back the block 518 of the data array 505 or the block 519 of the data array 506 to the address indicated by the high-order m bits 511 in the address array 502 or the high-order in bits 513 in the address array 503 (in step S706).

Next, the control unit 510 copies the high-order m bits 522 in the address register 501 to the high-order m bits 511 in the address array 502 or the high-order m bits 513 in the address array 503. Further, the control unit 510 sets the flag V202 and the flag F204 of the status bit string 512 of the address array 502 or the status bit string 514 of the address array 503 to 1, and the control unit 510 sets the flag D203 of the status bit string 512 of the address array 502 or the status bit string 514 of the address array 503 to 0 (in step S708). Then, the control unit 510 issues to the memory a request for reading the block which has caused the cache miss, and writes the block from the memory into the block 518 in the data array 505 or the block 519 in the data array 506 (in step S709).

When the control unit 510 determines that the eviction block address array 504 is vacant (Yes in step S702), the control unit 510 copies the high-order m bits 511 in the address array 502 for eviction or the high-order m bits 513 in the address array 503 for eviction to the high-order m bits 515 in the eviction block address array 504. Then, the control unit 510 sets the flag V206 and the flag D207 of the status bit string 516 to 1 and 0, respectively. Then, the control unit 510 sets the number for the way to be evicted to the way number 517 (in step S711).

Next, the control unit 510 determines whether or not the block to be evicted has been rewritten, based on whether the flag D203 of the status bit string in the address array 502 or 503 indicated by the way number 517 is 1 or 0 (in step S712). Only when the control unit 510 determines that the block to be evicted has been rewritten (Yes in step S712), the control unit 510 writes back the block 518 of the data array 505 or the block 519 of the data array 506 indicated by the way number 517 to the address indicated by the high-order m bits 511 in the address array 502 or the high-order in bits 512 in the address array 503 for replacement (in step S714).

Next, the control unit 510 copies the high-order m bits 522 in the address register 501 to the high-order m bits 511 of the address array 502 or the high-order m bits 513 of the address array 503 indicated by the way number 517. Then, the control unit 510 sets the flag V202 and the flag F204 of the status bit string 512 or the status bit string 514 to 1, and sets the flag D203 of the status bit string 512 or the status bit string 514 to 0 (in step S716). Then, the control unit 510 issues to the memory a request for reading the block which has caused the cache miss (in step S717). Next, the control unit 510 waits for arrival of the block from the memory (in step S718).

During a period before arrival of the block, the block which has been invalid in a related art and will be evicted becomes valid on the eviction block address array. Data in the block which will be evicted remains in the block 518 of the data array 505 or the block 519 of the data array 506.

Next, the block which has been read arrives at the cache memory (in step S719). The control unit 510 sets the flag V206 of the status bit string 516 in the eviction block address array 504 to 0, for invalidation (in step S720). The control unit 510 examines the flag D207 of the status bit string 516 in the eviction block address array 504 to check whether or not the block has been rewritten (in step S721).

Only when the control unit 510 determines that the block has been rewritten (Yes in step S721), the control unit 510 writes back the block 518 of the data array 505 or the block 519 of the data array 506 indicated by the way number 517 to the address of the eviction block address array 504 indicated by the high-order m bits 515 (in step S723). Then, the control unit 510 writes the block read from the memory into the block 518 of the data array 505 or the block 519 of the data array 506 indicated by the way number 517. Then, the control unit 510 sets the flag F204 of the status bit string 108 in the address array 102 to 0 (in step S725).

Next, operations of the cache memory in the second example will be described, with reference to FIGS. 9 to 15.

Figure 9:
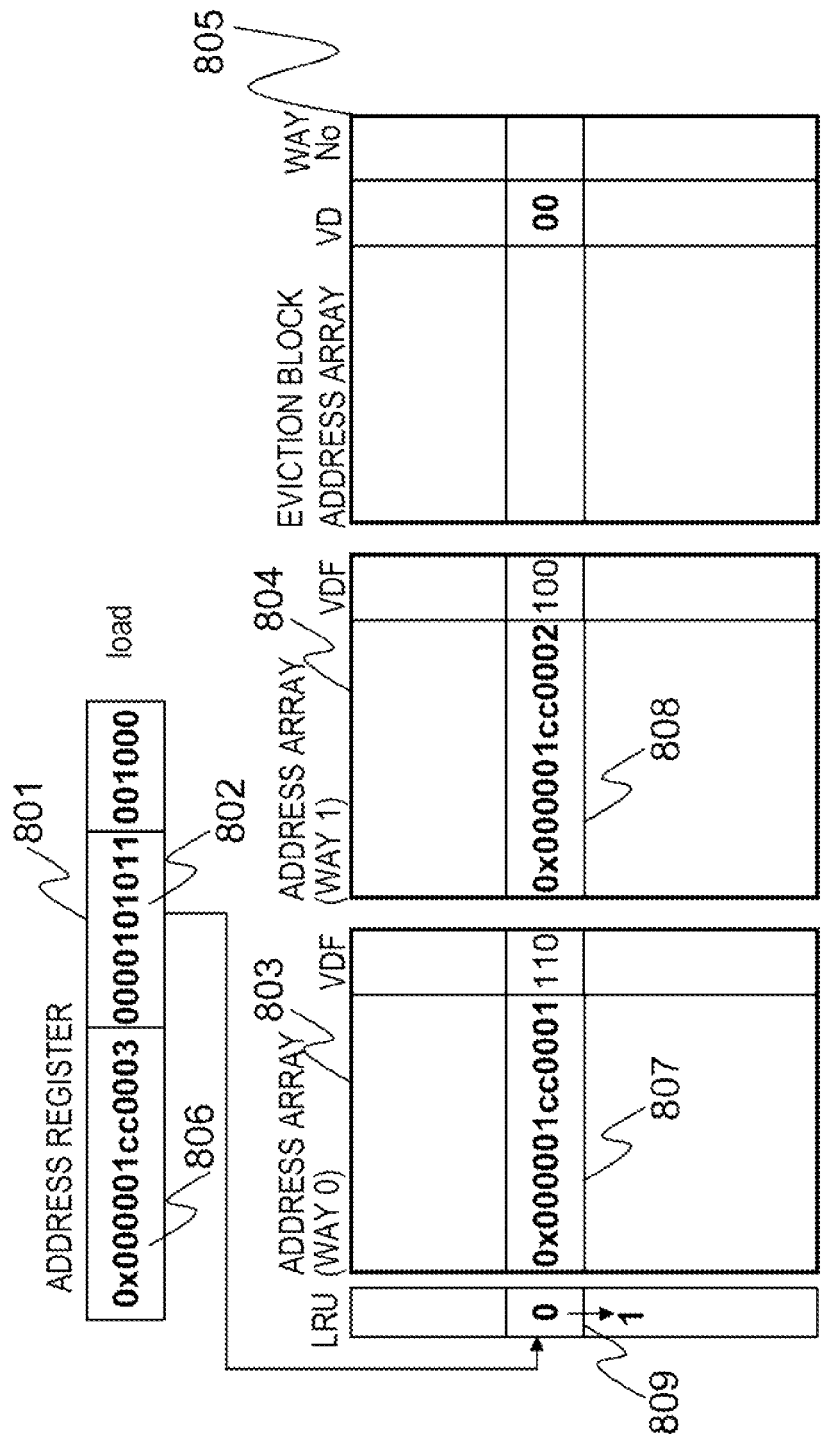
FIG. 9 is a diagram for explaining an operation of the cache memory in the second example.

FIG. 9 shows a point of time at which data for a different block to be cached in a same column has been loaded in a state where blocks are cached in two ways. First, the column is selected using n bits 802 in an address register 801 as an index. Then, entries are read from an address array (way 0) 803, an address array (way 1) 804, and an eviction block address array 805, and are respectively compared with 0x000001cc0003 of high-order m bits 806 in the address register.

High-order m bits 807 in the address array (way 0) 803 are 0x000001cc0001, high-order m bits 808 in the address array (way 1) 804 are 0x000001cc0002, and an entry in the eviction block address array is invalid. Consequently, it can be seen that a cache miss has occurred. Since the entries of the address array (way 0) 803 and the address array (way 1) 804 are valid, replacement will occur. Then, by referring to an LRU809, a way 0 is targeted for the replacement. Then, the LRU809 is updated to 1.

Figure 10:
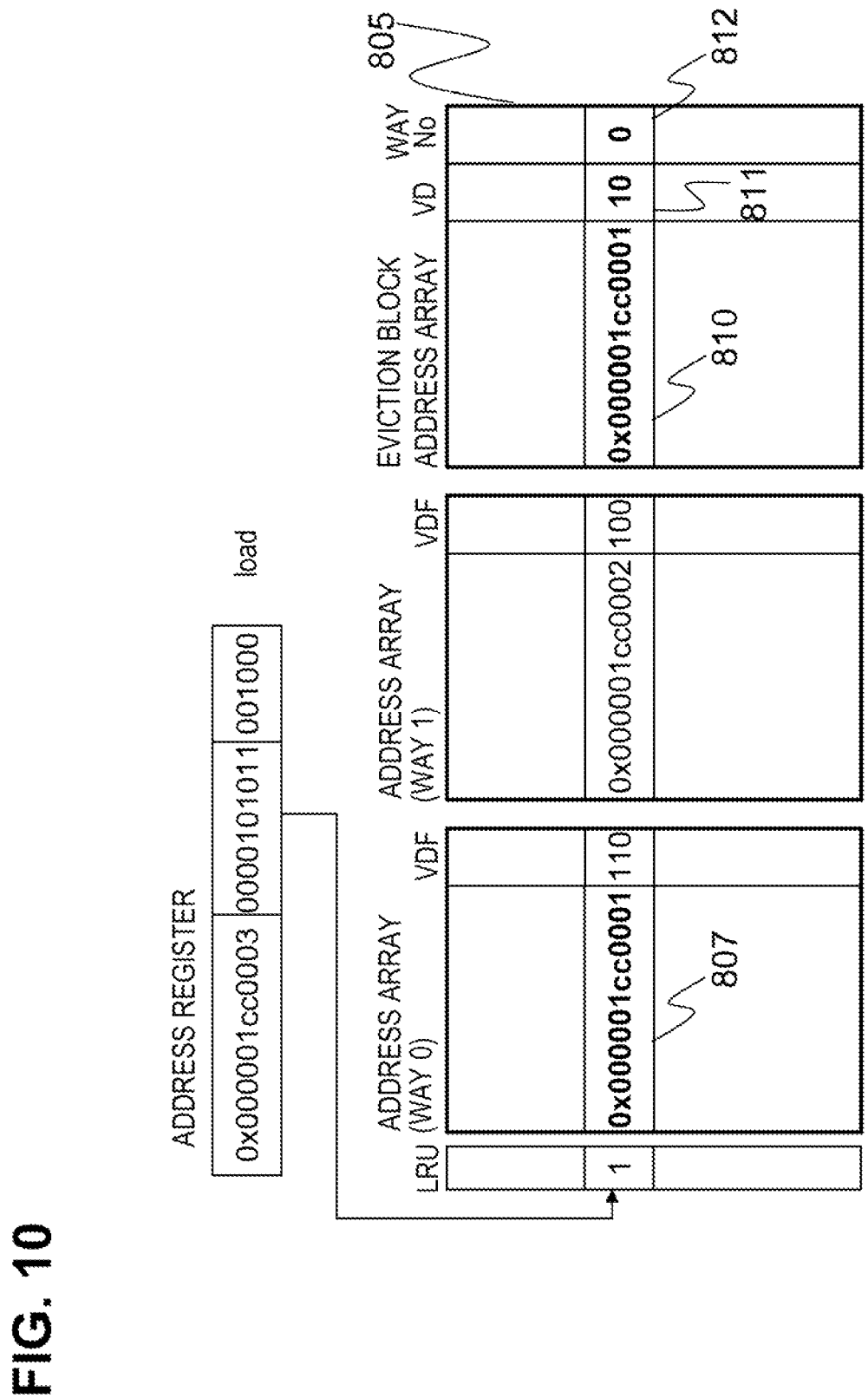
FIG. 10 is a diagram for explaining an operation of the cache memory in the second example.

FIG. 10 is a diagram for explaining a process of validating an entry in the eviction block address array. Since the entry in the eviction block address array 805 is vacant, the high-order m bits 807 of the way 0 targeted for the replacement are evicted are copied to high-order in bits 810 of the eviction block address array. Then, a status bit string 811 is set to 10, and a way number 812 is set to 0. This makes the entry in the eviction block address array valid.

Figure 11:
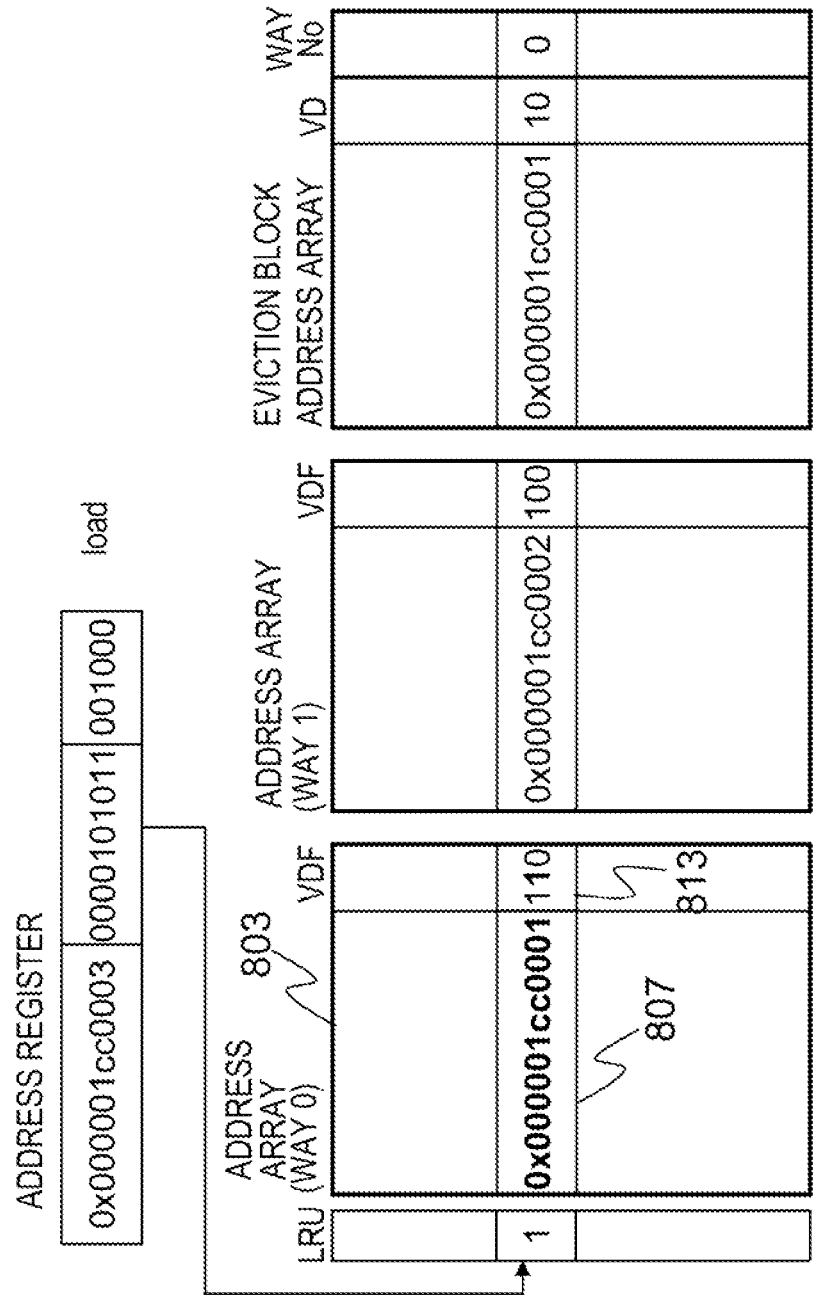
FIG. 11 is a diagram for explaining an operation of the cache memory in the second example.

FIG. 11 explains a write back process when a block targeted for the replacement has been rewritten. Since the flag D of a status bit string 813 in the address array (way 0) 803 is 1, the block on the data array of the way 0 is written back to the address indicated by the high-order m bits 807.

Figure 12:
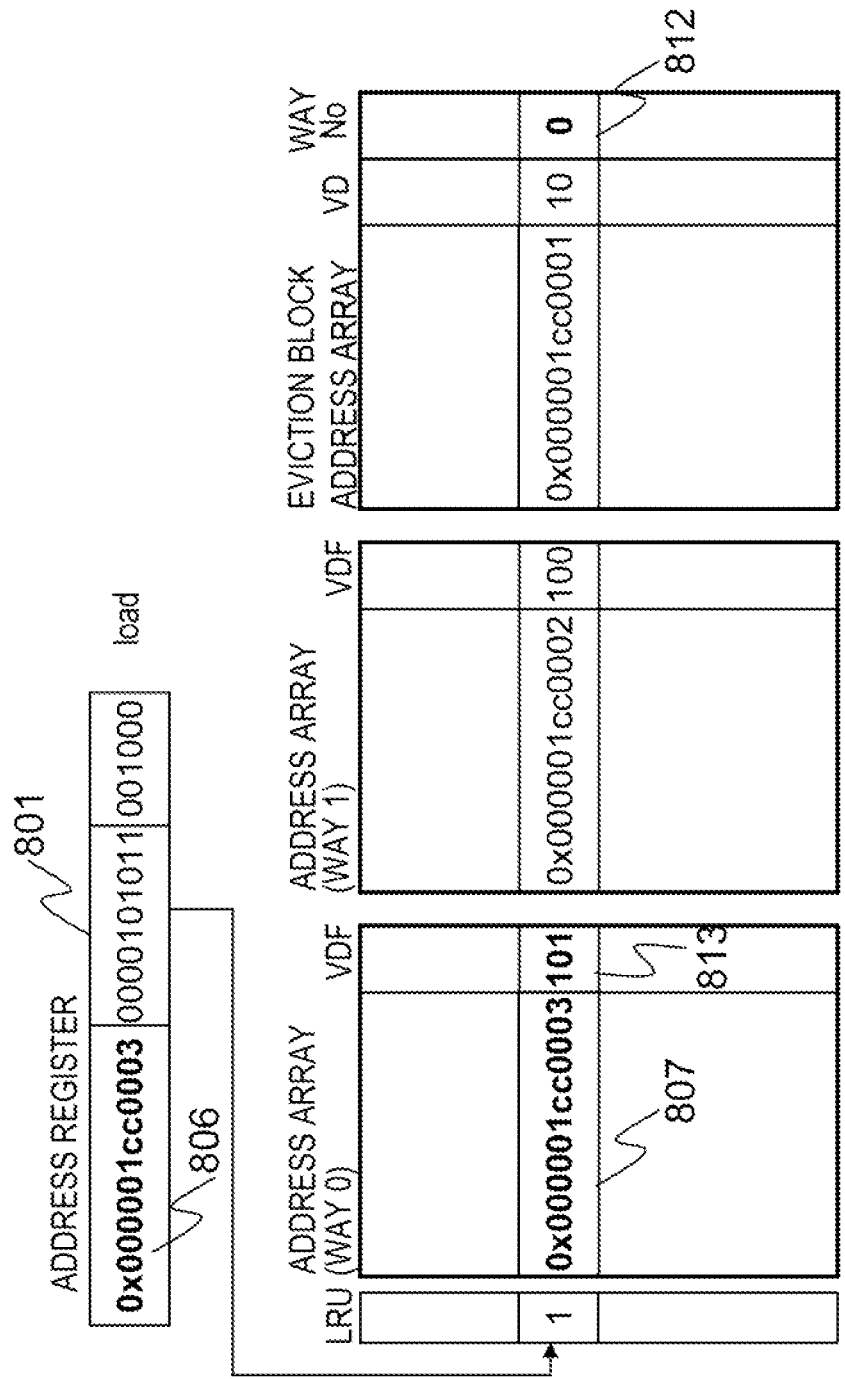
FIG. 12 is a diagram for explaining an operation of the cache memory in the second example.

FIG. 12 is a diagram for explaining a process of registering a block which has caused a cache miss in the address array, and reading the block which has caused the cache miss from a memory. The high-order in bits 806 in the address register 801 are copied to the high-order m bits 807 in the address array 803 of the way 0 indicated by the way number 812. Then, a flag VDF of the status bit string 813 is set to 101. Thereafter, a request for reading the block which has caused the cache miss from the memory is issued.

Figure 13:
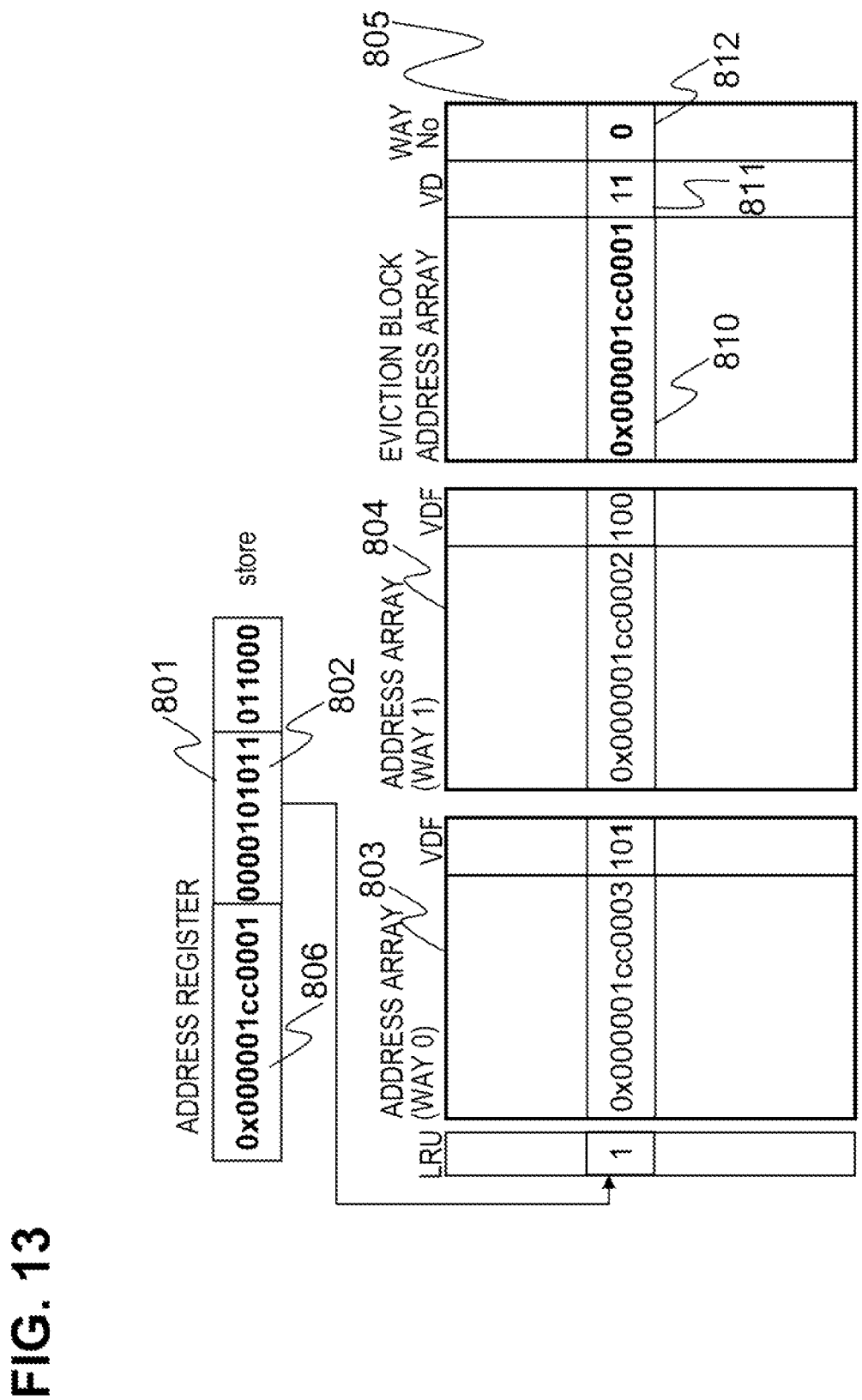
FIG. 13 is a diagram for explaining an operation of the cache memory in the second example.

FIG. 13 shows a state where during reading of the block which has caused the cache miss, a cache hit has occurred in the entry in the eviction block address array at a time of writing. A store instruction to the address in the address register 801 is executed, and the entries in the address arrays 803, 804, and 805 are read, using the n bits 802 as the index. Then, it is determined that 0x000001cc0001 of the high-order m bits 806 in the address register 801 match the high-order in bits 810 in the eviction block address array 805, so that the cache hit has occurred. Then, write data is written into the block of the data array of the way 0 indicated by the way number 812. The flag D of the status bit string in the eviction block address array 805 for storing rewriting becomes 1.

Figure 14:
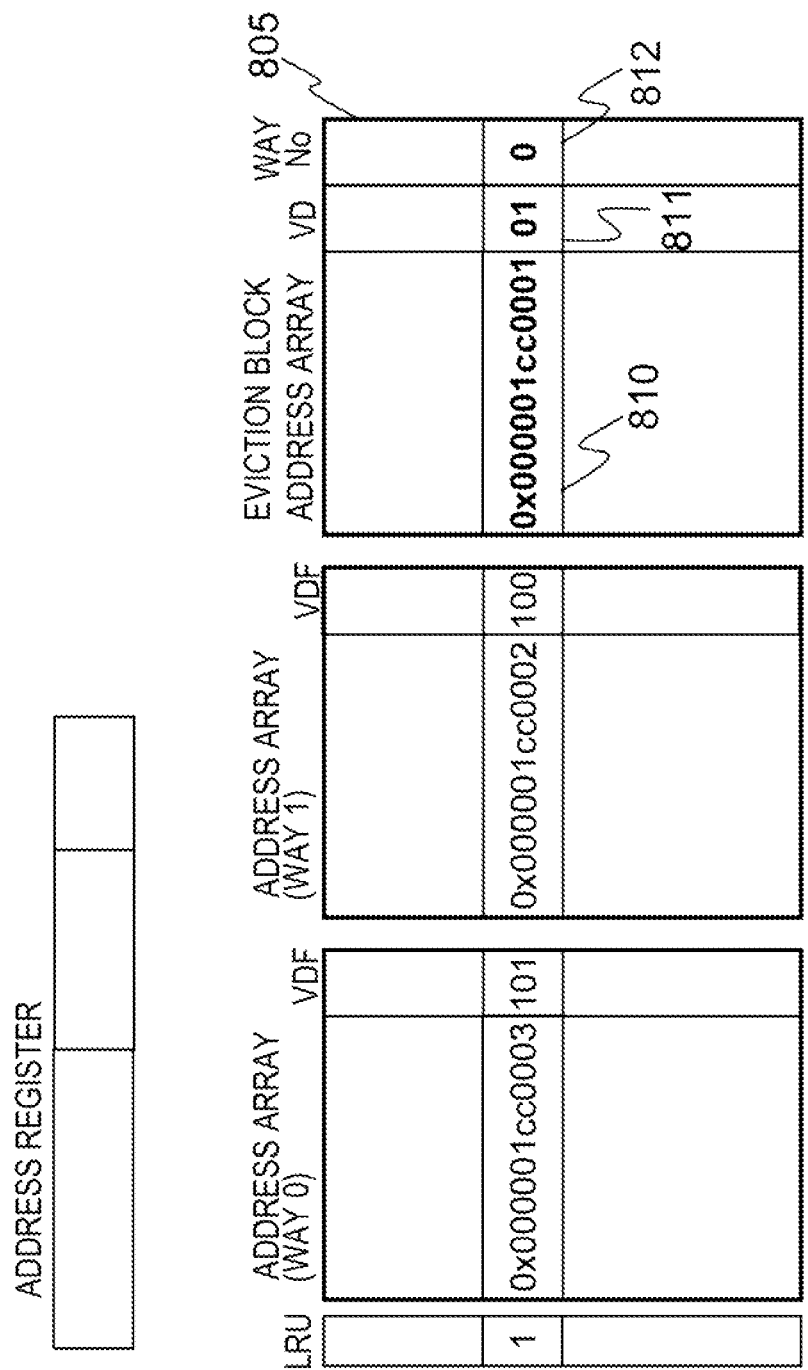
FIG. 14 is a diagram for explaining an operation of the cache memory in the second example.

FIG. 14 shows a process when the block read from the memory has arrived at the cache memory. First, the flag V of the status bit string 811 of the eviction block address array 805 is set to 0, thereby invalidating this entry. Then, it is checked whether or not rewriting has been performed, according to the flag D of the status bit string 811. Since the flag D is 1, it means that the rewriting has been performed due to the cache hit in the eviction block address array at the time of writing. Thus, the block of the data array of the way 0 indicated by the way number 812 is written back to the address indicated by the high-order m bits 810.

Figure 15:
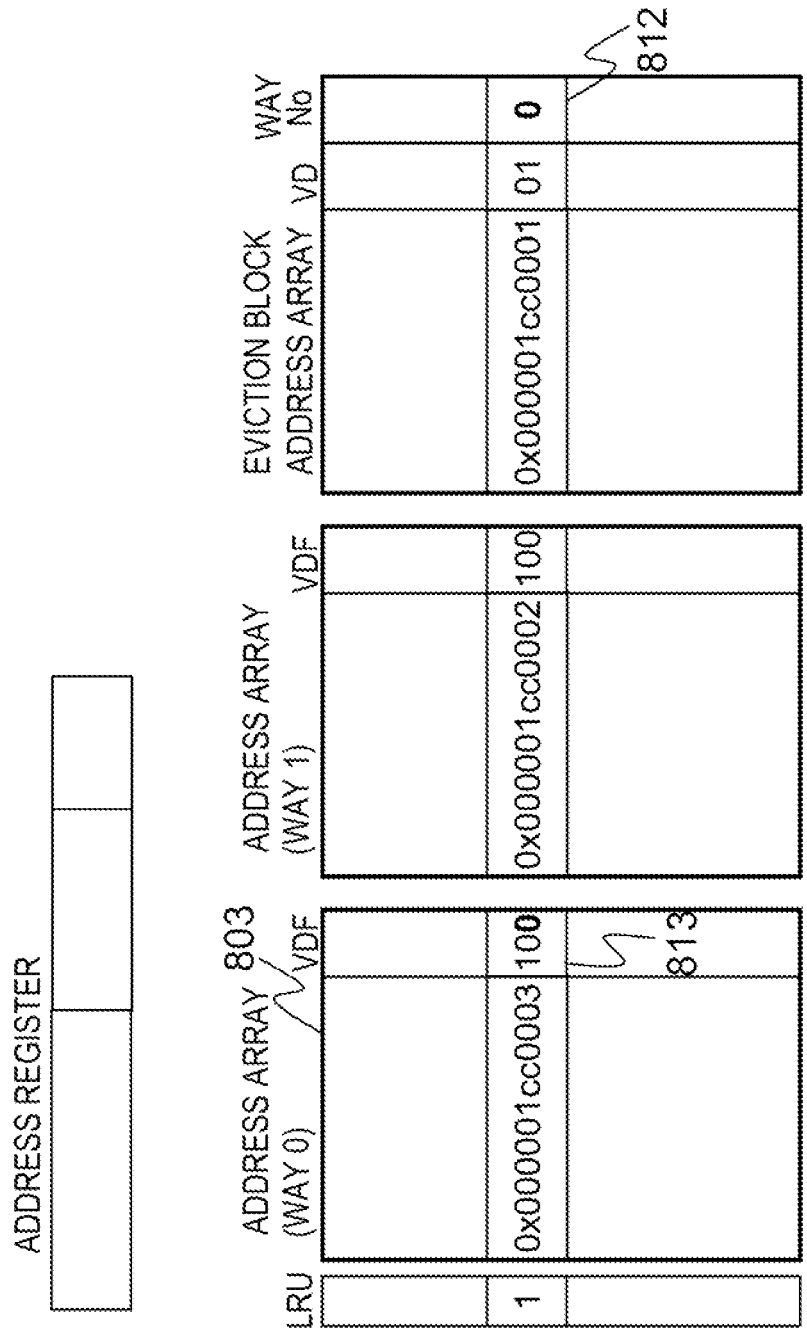
FIG. 15 is a diagram for explaining an operation of the cache memory in the second example.

FIG. 15 shows a process of writing the block read from the memory into the data array. The block read from the memory is written into the data array of the way 0 indicated by the way number 812, and then the flag F of the status bit string 813 in the address array 803 of the way 0 is set to 0.

Variations and adjustments of the exemplary embodiment and the examples may be made within the overall disclosure (including the claims) of the present invention, and based on the technical concept of the present invention. Various combinations and selections of various disclosed elements are possible within the scope of the claims of the present invention. That is, the present invention of course includes various variations and modifications that could be made by those skilled in the art according to the overall disclosure and the technical concept.

The present invention includes inventions according to the following additional modes.

(Mode 1)

A cache memory according to the first aspect described above.

(Mode 2)

The cache memory according to mode 1, wherein the control unit invalidates the address of the first block stored in the second address array when writing the second block into the data array.

(Mode 3)

The cache memory according to mode 1 or 2, wherein the second address array stores an identifier for a way in which the first block is stored.

(Mode 4)

The cache memory according to any one of modes 1 to 3, wherein the second address array stores a flag indicating whether or not the first block has resulted in a cache hit and has been rewritten.

(Mode 5)

The cache memory according to mode 4, wherein the control unit, before the second block is read from the memory and written into the data array, refers to the flag stored in the second address array and, if the first memory has been rewritten, writes back the first block to the memory.

(Mode 6)

A cache memory according to the second aspect described above.

(Mode 7)

An electronic computer including the cache memory according to any one of modes 1 to 6.

(Mode 8)

The electronic computer according to mode 7, including a multi-core or multi-thread processor.

(Mode 9)

A cache memory control method according to the third aspect described above.

(Mode 10)

The cache memory control method according to mode 9, further comprising invalidating the address of the first block stored in the second address array when writing the second block into the data array.

(Mode 11)

The cache memory control method according to mode 9 or 10, comprising storing in the second address array an identifier for a way in which the first block is stored.

(Mode 12)

The cache memory control method according to any one of modes 9 to 11, comprising storing in the second address array a flag indicating whether or not the first block has resulted in the cache hit and has been then rewritten.

(Mode 13)

The cache memory control method according to mode 12 comprising, before the second block is read from the memory and writing into the data array, referring to the flag stored in the second address array and, if the first block has been rewritten, writing back the first block to the memory.

What is claimed is:

1. A cache memory comprising:
a data array that stores a cached block;
a first address array that stores an address of the cached block;
a second address array that stores an address of a first block to be removed from the data array when a cache miss occurs; and
a control unit that transmits to a processor the first block stored in the data array as a cache hit block, in response to the address stored in the second address array resulting in a cache hit during a period before a second block that has caused the cache miss to be read from a memory and written into the data array, wherein the cache memory is configured to wait for the second block to be read from memory when it is determined that an entry in the second address array corresponding to the first block is not vacant.

2. The cache memory according to claim 1, wherein the control unit invalidates the address of the first block stored in the second address array when writing the second block into the data array.

3. The cache memory according to claim 1, wherein the second address array stores an identifier for a way in which the first block is stored.

4. The cache memory according to claim 1, wherein the second address array stores a flag indicating whether or not the first block has resulted in the cache hit and has been rewritten.

5. The cache memory according to claim 4, wherein the control unit, before the second block is read from the memory and written into the data array, refers to the flag stored in the second address array and, in response to the first block having been rewritten, writes back the first block to the memory.

6. A cache memory comprising:
an address array that stores an address of a block to be removed from a data array when a cache miss occurs; and
a control unit that transmits to a processor the block stored in the data array as a cache hit block, in response to the address stored in the address array resulting in a cache hit during a period before a block that has caused the cache miss being read from a memory and stored in the data array, wherein the cache memory is configured to wait for the second block to be read from memory when it is determined that entry in the second address array corresponding to the first block is not vacant.

7. An electronic computer comprising the cache memory according to claim 1.

8. The electronic computer according to claim 7, comprising a multi-core or multi-thread processor.

9. A control method of a cache memory comprising a data array that stores a cached block, a first address array that stores an address of the cached block, and a second address array, the method comprising:
storing in the second address array an address of a first block to be removed from the data array when a cache miss occurs; and
transmitting to a processor the first block stored in the data array as a cache hit block, in response to the address stored in the second address array resulting in a cache hit during a period before a second block which has caused the cache miss being read from a memory and written into the data array, wherein the cache memory is configured to wait for the second block to be read from memory when it is determined that an entry in the second address array ding to the first block is not vacant.

10. The cache memory control method according to claim 9, further comprising: invalidating the address of the first address stored in the second address array when writing the second block into the data array.

11. The cache memory control method according to claim 9, comprising storing in the second address array an identifier for a way in which the first block is stored.

12. The cache memory control method according to claim 9, comprising storing in the second address array a flag indicating whether or not the first block has resulted in the cache hit and has been rewritten.

13. The cache memory control method according to claim 12, comprising, before the second block is read from the memory and written into the data array, referring to the flag stored in the second address array and, if the first block has been rewritten, writing back the first block to the memory.

* * * * *